United States Patent
Straalsund et al.

(10) Patent No.: US 11,396,885 B2
(45) Date of Patent: Jul. 26, 2022

(54) SCREW SYSTEMS

(71) Applicant: Percheron Power, LLC, Kennewick, WA (US)

(72) Inventors: Jerry L. Straalsund, Kennewick, WA (US); Sharon D. Atkin, Kennewick, WA (US); Nicholas Z. Hertelendy, West Richland, WA (US)

(73) Assignee: Percheron Power, LLC, Kennewick, WA (US)

( * ) Notice: Subject to any disclaimer, the term of this patent is extended or adjusted under 35 U.S.C. 154(b) by 56 days.

(21) Appl. No.: 17/104,992

(22) Filed: Nov. 25, 2020

(65) Prior Publication Data

US 2021/0140444 A1     May 13, 2021

Related U.S. Application Data

(62) Division of application No. 16/147,389, filed on Sep. 28, 2018, now Pat. No. 10,851,799.

(Continued)

(51) Int. Cl.
     *B29C 43/12*          (2006.01)
     *F04D 29/38*        (2006.01)
     (Continued)

(52) U.S. Cl.
CPC ........ *F04D 29/388* (2013.01); *B29C 37/0032* (2013.01); *B29C 43/12* (2013.01); *B29C 70/68* (2013.01); *F03B 3/121* (2013.01); *F03B 3/126* (2013.01); *F04D 3/02* (2013.01); *F04D 29/34* (2013.01); *F04D 29/384* (2013.01); *B29L 2031/08* (2013.01); *F04B 19/12* (2013.01); *F04D 29/043* (2013.01);
(Continued)

(58) Field of Classification Search
CPC ...... F04D 29/026; F04D 29/181; F03B 3/121; F05D 2240/243; B29C 43/12; B29C 37/0032; B29C 70/68; B29L 2031/08
See application file for complete search history.

(56) References Cited

U.S. PATENT DOCUMENTS

| | | |
|---|---|---|
| 1,349,077 A | 8/1920 | McChesney |
| 2,728,401 A | 12/1955 | Brannon |

(Continued)

FOREIGN PATENT DOCUMENTS

| | | |
|---|---|---|
| EP | 10203160 B1 | 6/2004 |
| FR | 2981130 A1 | 4/2013 |
| RU | 181392 U1 | 7/2018 |

OTHER PUBLICATIONS

Non Final Office Action dated Apr. 8, 2020 for U.S. Appl. No. 16/147,389 "Screw Systems" Straalsund, 14 pages.

(Continued)

*Primary Examiner* — Ninh H. Nguyen
(74) *Attorney, Agent, or Firm* — Lee & Hayes, P.C.

(57) ABSTRACT

A screw system including a plurality of segmented blades. Each blade segment of the plurality of blade segments including a mounting portion and a vane portion. The mounting portion, having a helical length, for removably attaching the blade segment. The vane portion extending from the mounting portion along the helical length thereof.

(Continued)

The vane portion having a front surface that is not parallel to a back surface from the mounting portion to a tip of the blade segment, along the helical length.

20 Claims, 16 Drawing Sheets

Related U.S. Application Data

(60) Provisional application No. 62/713,740, filed on Aug. 2, 2018.

(51) Int. Cl.
| | |
|---|---|
| *F04D 3/02* | (2006.01) |
| *F04D 29/34* | (2006.01) |
| *F03B 3/12* | (2006.01) |
| *B29C 37/00* | (2006.01) |
| *B29C 70/68* | (2006.01) |
| *F04D 29/043* | (2006.01) |
| *F04D 29/18* | (2006.01) |
| *F16B 5/02* | (2006.01) |
| *F04B 19/12* | (2006.01) |
| *B29L 31/08* | (2006.01) |

(52) U.S. Cl.
CPC ........ *F04D 29/181* (2013.01); *F05D 2250/25* (2013.01); *F16B 5/02* (2013.01)

(56) References Cited

U.S. PATENT DOCUMENTS

| | | |
|---|---|---|
| 2,744,465 A | 5/1956 | Springer |
| 3,255,220 A | 6/1966 | Baer |
| 4,274,751 A | 6/1981 | Rector et al. |
| 4,751,123 A | 6/1988 | Broquere et al. |
| 5,099,985 A * | 3/1992 | Lapeyre ................ B65G 33/12 |
| | | 198/666 |
| 5,899,319 A * | 5/1999 | Jarnagin ................ B65G 33/32 |
| | | 198/666 |
| 6,357,998 B1 | 3/2002 | Rosefsky |
| 7,946,355 B1 | 5/2011 | Kluge |
| 8,079,948 B2 | 12/2011 | Shifflette |
| 8,215,477 B2 * | 7/2012 | Basaglia ................ B30B 9/121 |
| | | 198/662 |
| 9,784,107 B2 | 10/2017 | Gilbert |
| 2011/0142641 A1 | 6/2011 | Anderson |
| 2015/0107965 A1 * | 4/2015 | Price ........................ E02D 5/56 |
| | | 198/657 |
| 2016/0053763 A1 | 2/2016 | Toellner |
| 2020/0040907 A1 | 2/2020 | Straalsund et al. |

OTHER PUBLICATIONS

The PCT Search Report and Written Opinion dated Oct. 17, 2019 for PCT Application No. PCT/US2019/044498, 10 pages.

* cited by examiner

SCREW SYSTEMS

RELATED APPLICATIONS

This application is a divisional of and claims priority to U.S. application Ser. No. 16/147,389, filed on Sep. 28, 2018, entitled "Screw Systems", which claims priority and the benefit of U.S. Provisional Application Ser. No. 62/713,740, filed Aug. 2, 2018, entitled "Screw Systems," both of which are hereby incorporated by reference in their entirety.

BACKGROUND

Steel screw turbines (e.g., hydrodynamic screws) exist for producing power. However, manufacture of these steel turbines is time consuming and they are costly to ship and install. For example, conventional steel turbines may be formed from consecutive annular sections of a steel plate that has been bent to have a blade shape. The annular sections of the bent steel plate may be welded to a central steel tube, and adjacent annular sections are also welded together. After welding the annular sections to the central tube and to each other, the welds and/or outside edges of the bent steel plate may be ground and/or machined. Following these operations, the screw may be prepped and painted for appearance and corrosion resistance. The relatively large and relatively heavy steel turbines may then be shipped fully assembled to a site where a crane may be employed to install the steel turbines for use to generate power.

The labor-intensive work involved in fabricating the steel turbines is time consuming and costly. Moreover, it is difficult and costly to ship the fully assembled steel turbines. Further, the maximum flow through each turbine (and therefore, power output) is physically limited by the largest allowable diameter which may be transported. Accordingly, there remains a desire to overcome the limitations of the steel turbines including minimizing the amount and difficulty level of the labor to fabricate a turbine and reducing shipping costs and physical challenges of transportation.

SUMMARY

Screw systems and techniques for manufacturing such systems are described herein. More specifically, this disclosure relates to composite screw systems that have a plurality of blade segments, each of the plurality of blade segments being removably attachable or permanently attachable to a shaft. This summary is provided to introduce simplified concepts of composite screw systems, which are further described below in the Detailed Description. This summary is not intended to identify essential features of the claimed subject matter, nor is it intended for use in determining the scope of the claimed subject matter.

In an embodiment, a blade for a screw system includes a blade segment formed of a composite material. The blade segment may include an integral mounting portion and a vane portion. The integral mounting portion may have a helical length, for removably attaching the blade segment to an outside surface of a shaft around which the blade is attachable. The vane portion may extend from the integral mounting portion along the helical length thereof. The vane portion may have a front surface and a back surface. The front surface may not be parallel to the back surface such that a cross section of the blade segment varies from the mounting portion to a tip of the blade segment, along the helical length.

In another embodiment, a screw system includes a plurality of blade segments. Each blade segment of the plurality of blade segments may include an integral mounting portion and a vane portion. The integral mounting portion may have a helical length, for removably attaching the blade segment. The vane portion may extend from the integral mounting portion along the helical length thereof, and may have a front surface and a back surface, where the front surface may not be parallel to the back surface such that a cross section of the blade segment varies from the mounting portion to a tip of the blade segment, along the helical length. A shaft formed of a composite material may have an outside surface for removably attaching the plurality of blade segments thereto, the plurality of blade segments wrapping around the outside surface along a helical length. The shaft may include a plurality of holes disposed in the outside surface along the helical length configured to receive fasteners and removably attach the plurality of blade segments to the shaft from the outside of the shaft.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
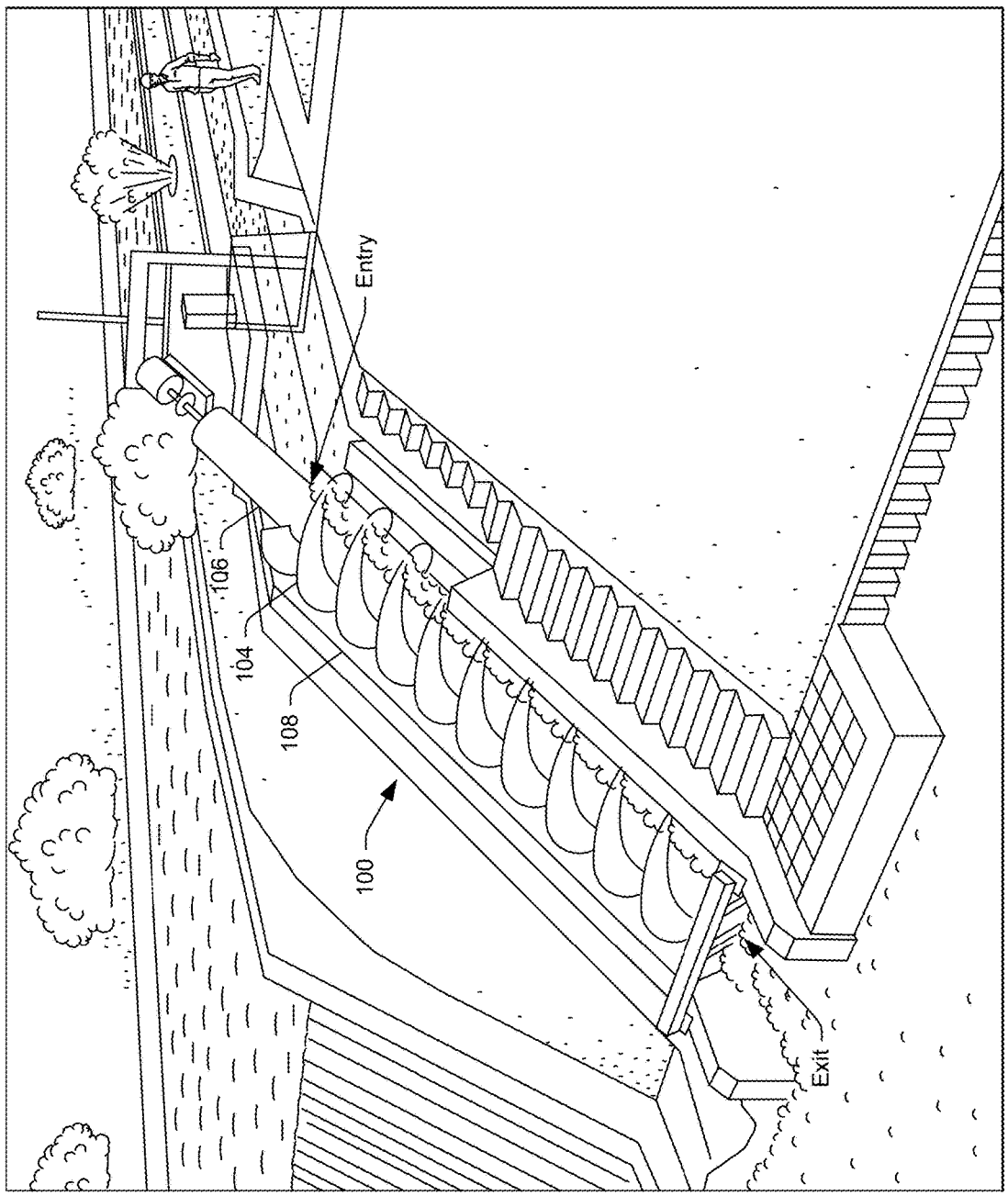
FIG. 1 illustrates an example screw system operating in a hydrodynamic environment to produce power.

This disclosure is directed to screw systems having blade segments formed of a composite material, where the blade segments are removably or permanently attachable to a shaft. In forming the blade segments of a composite material, the blade segments may be formed via a closed mold system formation process, which provides for: consistency and repeatability in producing the blade segments, higher productivity and lower labor costs in producing the blade segments, and lower consumption of material in producing the blade segments. The closed mold fabrication process is specifically unlike blades of existing Archimedes screws and other claims for removable blades in that the blade segments in this disclosure are not formed by rolling, cutting, bending, folding, or welding. Additionally, fabricating the blades of composite materials provides greatly increased corrosion resistance over current steel blades, particularly in wastewater applications where hydrogen sulfide is present. Utilizing gelcoat in the mold as an integral part of the manufacturing process also provides a smooth, reproducible surface with less hydraulic friction and eliminates the need for prepping and final painting of the blades and the screw system, as compared with other steel screws today.

Moreover, because the blade segments are removably attachable to the shaft, the screw systems may be shipped unassembled and subsequently assembled in the field reducing an amount of time and a cost of deploying the screw systems. The removable blades may also be maintained or replaced as needed in the field without removing the screw system.

In another example, screw systems include a blade. The blade includes a blade segment formed of a composite material having a mounting portion and a vane portion. The mounting portion may be integral to the blade, and the mounting portion defines a helical length. The mounting portion provides for removably attaching the blade segment to an outside surface of a shaft around which the blade is attachable. The vane portion may extend from the mounting portion along the helical length thereof. The vane portion may have a front surface and a back surface. The front surface may not be parallel to the back surface such that a cross section of the blade segment varies from the mounting portion to a tip of the blade segment, along the helical length. Thus, for example, in an embodiment, the vane portion may be tapered from the integral mounting portion to a tip of the blade segment, along the helical length. In view of the mounting portion, the blade segment may be quickly and easily attached to the shaft at a reduced cost. Moreover, the vane portion of the blade segment is optimized for best performance and manufacturability.

While this application describes various embodiments of screw systems used in a hydrodynamic environment to produce power, this is by way of example and not limitation. For example, the screw systems may be used in other fields such as in a hydrodynamic environment to pump water or other fluids, in a hydrodynamic environment as a fishway, in a dry environment as a conveyor to move granular materials, in a drilling environment as an augur to bore a hole, etc. Further, while this application describes blade segments that are removably attachable to a shaft, the blade segments may be permanently attached to the shaft. For example, the blade segments may be bonded to the shaft via an adhesive, a wrap (e.g., composite wrap, fiberglass wrap, an adhesive tape, etc.), an epoxy, etc. Further, and for example, the blade segments may be snap-fit, press fit, interference fit, friction fit, etc. to the shaft. Further, while this application describes a shaft formed of a composite material, the shaft may be formed of other material. For example, the shaft may be formed of metal, plastic, wood, ceramic, etc. Further, while this application describes blind holes in the shaft for removably attaching the blade segments, the shaft could contain through holes, stepped holes, threaded holes, studs, or other fasteners mounted on the shaft to receive the blade segments. Further, while this application describes blade segments formed via a closed mold system formation process, the blade segments may be formed via other processes. For example, the blade segments may be formed via a 3D (three-dimensional) printing process, an open mold process, an additive manufacturing process, a rapid prototype process, a CNC (computer numerical control) machining process, a casting process, etc.

Illustrative Screw System

FIG. 1 illustrates an example screw system 100 operating in a hydrodynamic environment 102 to produce power. The screw system 100 may be a screw turbine system. For example, the screw system 100 may be an optimized composite Archimedes hydrodynamic screw turbine. The screw system 100 may have a constant outside diameter of about 6 feet to provide a flow capacity of about 50 cubic feet per second and may operate in hydrodynamic environments having a head drop of 10 feet. In another example, the screw system 100 may have a constant outside diameter of 18 feet to provide a flow capacity of about 600 cubic feet per second and may operate in hydrodynamic environments having a head drop of 40 feet. The screw system 100 may include an outer trough 108 outside of the blade 104.

The screw system 100 may include a blade 104 attached to a shaft 106. For example, the blade 104 may include a plurality of blade segments formed of a composite material that are removably attached to the shaft 106. The shaft 106 may be formed of a composite material different than the composite material forming the plurality of blade segments. For example, the shaft 106 may be formed of a multi-layer filament-wound composite and the plurality of blade segments may be formed of a closed molded system composite. The shaft 106 may be formed of a multi-layer filament-wound pressure pipe. The blade segments may be formed of a resin infused fiber.

Figure 2:
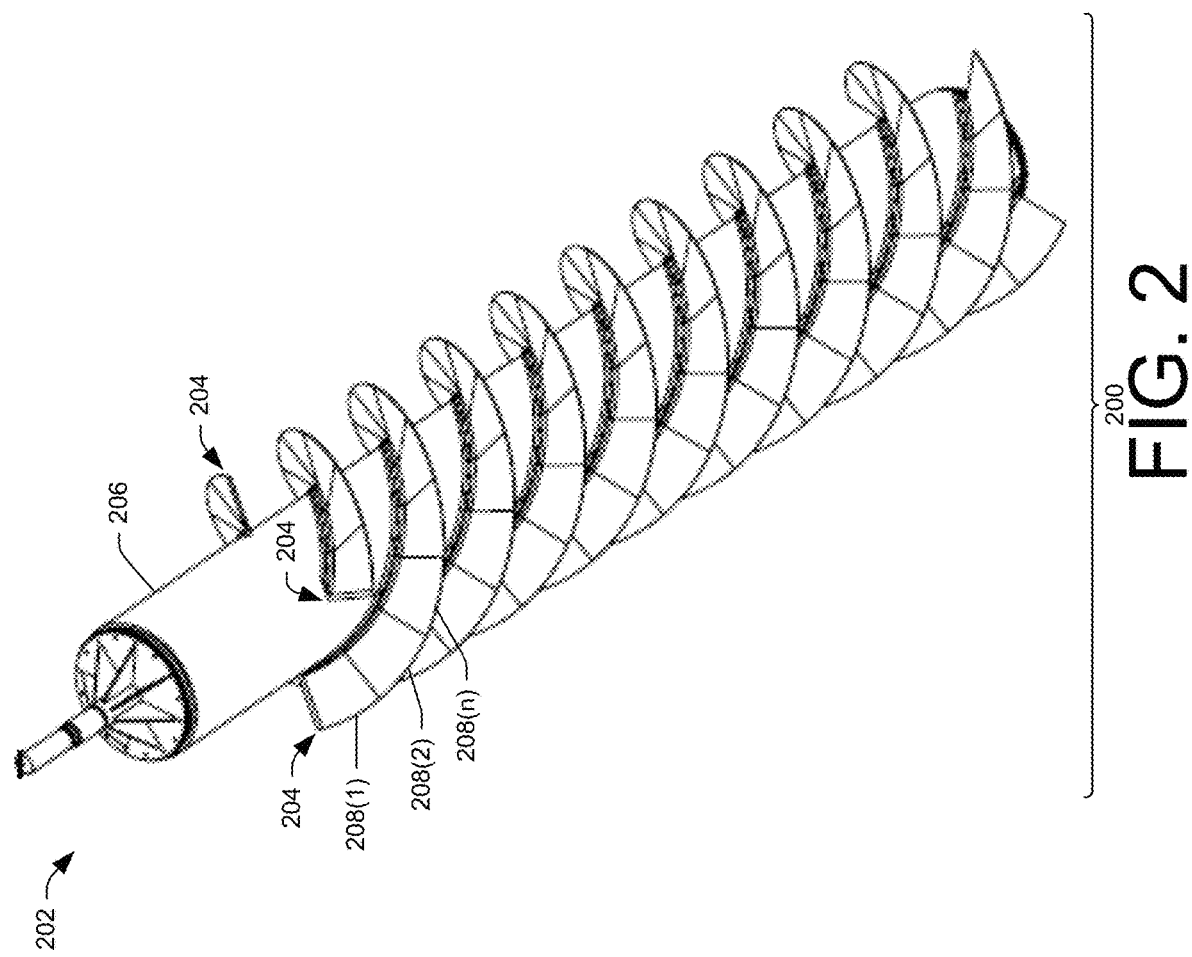
FIG. 2 illustrates a perspective view of an example screw system that may be implemented in the hydrodynamic environment of FIG. 1 according to an embodiment in this disclosure.

FIG. 2 illustrates a perspective view 200 of an example screw system 202 that may be implemented in the hydrodynamic environment of FIG. 1 according to an embodiment in this disclosure. The screw system 202 may be the same as the screw system 100 in FIG. 1. The screw system 202 may include at least one or a plurality of blades 204 attached to a shaft 206. Each of the plurality of blades 204 may include a plurality of blade segments 208(1), 208(2), 208($n$) attached to the shaft 206. While FIG. 2 illustrates the screw system 202 includes four blades 204, the screw system 202 may include any number of blades (e.g., blade flights). For example, the screw system may include three, four, five, six, etc. blade flights attached to the shaft 206.

In an embodiment, the blade segments 208(1)-208($n$) may be substantially identical and are aligned with each other such that the blade segments 208(1)-208(n) overlap. For example, a first blade segment may be substantially identical to a second blade segment and aligned with the second blade segment such that at least a portion of the first blade segment overlaps at least a portion of the second blade segment along the helical length when the first and second blade segments are removably attached to the outside surface of the shaft 206.

In an alternative embodiment, the blade segments 208(1)-208(n) may not be substantially identical. For example, an optimized inlet blade segment or an optimized outlet blade segment (discussed below with regard to FIG. 9 and with regard to FIG. 11, respectively) may not be substantially identical to an adjacent blade segment there between. For example, an optimized inlet blade segment or an optimized outlet blade segment may have a different shape (e.g., a different curve) than a shape (e.g., a curve) of an adjacent blade segment to provide for an optimized end of the optimized inlet blade segment or an optimized end of the optimized outlet blade segment. An optimized end of the optimized inlet blade segment or an optimized end of the optimized outlet blade segment may be reduced or extended to provide less resistance when water enters or exits the screw system 202.

In an alternative embodiment, the blade segments 208(1)-208(n) may not be substantially identical. For example, a first blade segment may be formed of a first material, and a second blade segment may be formed of a second material different than the first material. For example, the first blade segment may be formed of a first material including fiber, resin, or coating different than the second blade segment formed of a second material including a different fiber, a different resin, or a different coating. For example, an entry blade segment and/or an exit blade segment may be formed of a stronger material than a material forming a neighboring blade segment. In another example, the exit blade segments of a flight of blade segments may be formed of or incorporate stronger materials than the remaining blade segments of the flight of blade segments. Each blade segment may be tailored to different stresses associated with each blade segment.

Figure 3:
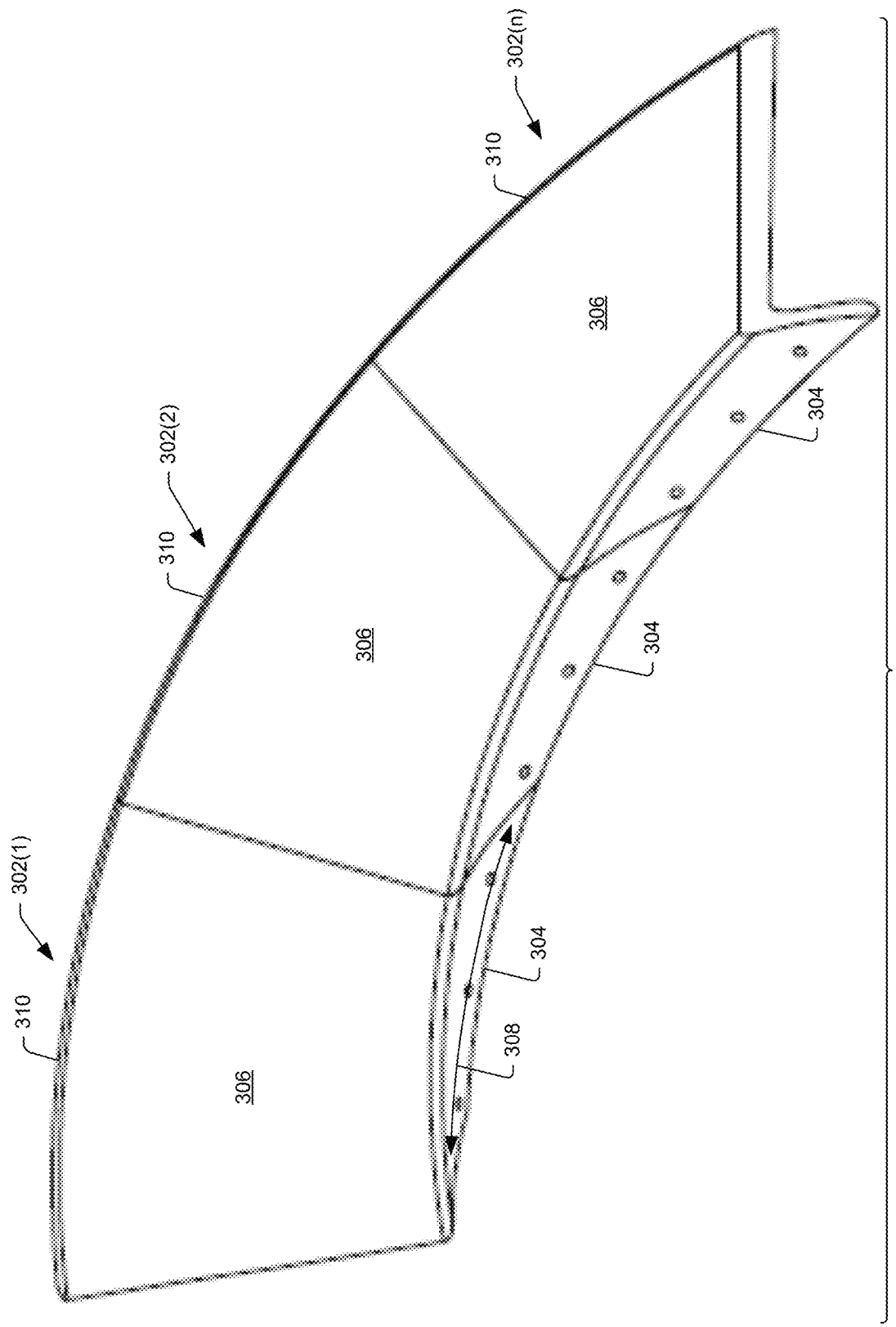
FIG. 3 illustrates a perspective view of a first side of a plurality of blade segments removably detached from a shaft of the screw system, in FIG. 2, according to an embodiment in this disclosure.

FIG. 3 illustrates a front perspective view 300 of a plurality of blade segments 302(1), 302(2), and 302(n) that are removably attachable to a shaft such as shaft 206 of the screw system 202, in FIG. 2, according to an embodiment in this disclosure. The plurality of blade segments 302(1)-302(n) may be the same as the plurality of blade segments 208(1)-208(n). Each blade segment of the plurality of blade segments 302(1)-302(n) may be formed of a composite material. Each blade segment of the plurality of blade segments 302(1)-302(n) may include a mounting portion 304 and a vane portion 306. The mounting portion 304 has a helical length 308, along which the blade segment is removably attachable to an outside surface of a shaft (e.g., shaft 206) to form a blade (e.g., blade 204). The vane portion 306 extends from the mounting portion 304 along the helical length 308 thereof. In one example, the vane portion 306 may be tapered from its intersection with the mounting portion 304 to a tip 310 of the vane portion 306 on a blade segment. The tapered blade segment may have a thickness at the tip 310 that is about 50% of the thickness of the root 304. In another example, the vane portion 306 may not be tapered, where the non-tapered blade segment may have a thickness at the tip 310 that is about equal to a thickness of the root 304. In another example, the vane portion 306 may have any different cross section other than a taper or non-taper such that at some or all points the front surface of the vane portion is not parallel to the back surface of the vane portion.

The mounting portion 304 may have a first helicoid shape. The vane portion 306 may have a second helicoid shape different than the first helicoid shape of the mounting portion. The front side of the vane portion 306 may have a second helicoid shape different than the helicoid shape of the back side of the vane portion.

A flexible material may be arranged between blade segments to control fluid leakage between blade segments. For example, a flexible material may be arranged between a first blade segment and a second blade segment to control fluid leakage between the first blade segment and the second blade segment. The flexible material may be disposed along the vane portion of the first blade segment and the vane portion of the second blade segment. Further, the flexible material may be applied as a liquid or a solid. The flexible material may be a rubber, a plastic, a fabric, etc.

The flexible material may be arranged on the tip 310 (e.g., outer helical radius). When the screw system 202 is deployed, the flexible material arranged on the tip 310 may be arranged between the tip 310 of the blade segment and an outer trough outside of the blade segment to control fluid leakage between the tip of the blade segment as the screw rotates in the outer trough. Further, the flexible material may be applied as a liquid or a solid. The flexible material may be a rubber, a plastic, a fabric, etc.

In one example, the helical length 308 may extend about 30, about 45, about 60, about 90, or about 180 degrees of rotation about the outside surface of the shaft 206. In another example, the helical length 308 may extend from at least about 30 degrees to at most about 180 degrees of rotation about the outside surface of the shaft 206. In another example, the helical length 308 may extend any degrees of rotation about the outside surface of the shaft 206.

While FIG. 3 illustrates the blade segments 302(1)-302(n) having an L-shaped cross-sectional profile, the blade segments 302(1)-302(n) may have other cross-sectional profiles. For example, the blade segments 302(1)-302(n) may have a T-shaped profile. For example, the blade segments 302(1)-302(n) may have another mounting portion extending out away from the vein portion 306 and opposite to the mounting portion 304.

Figure 4:
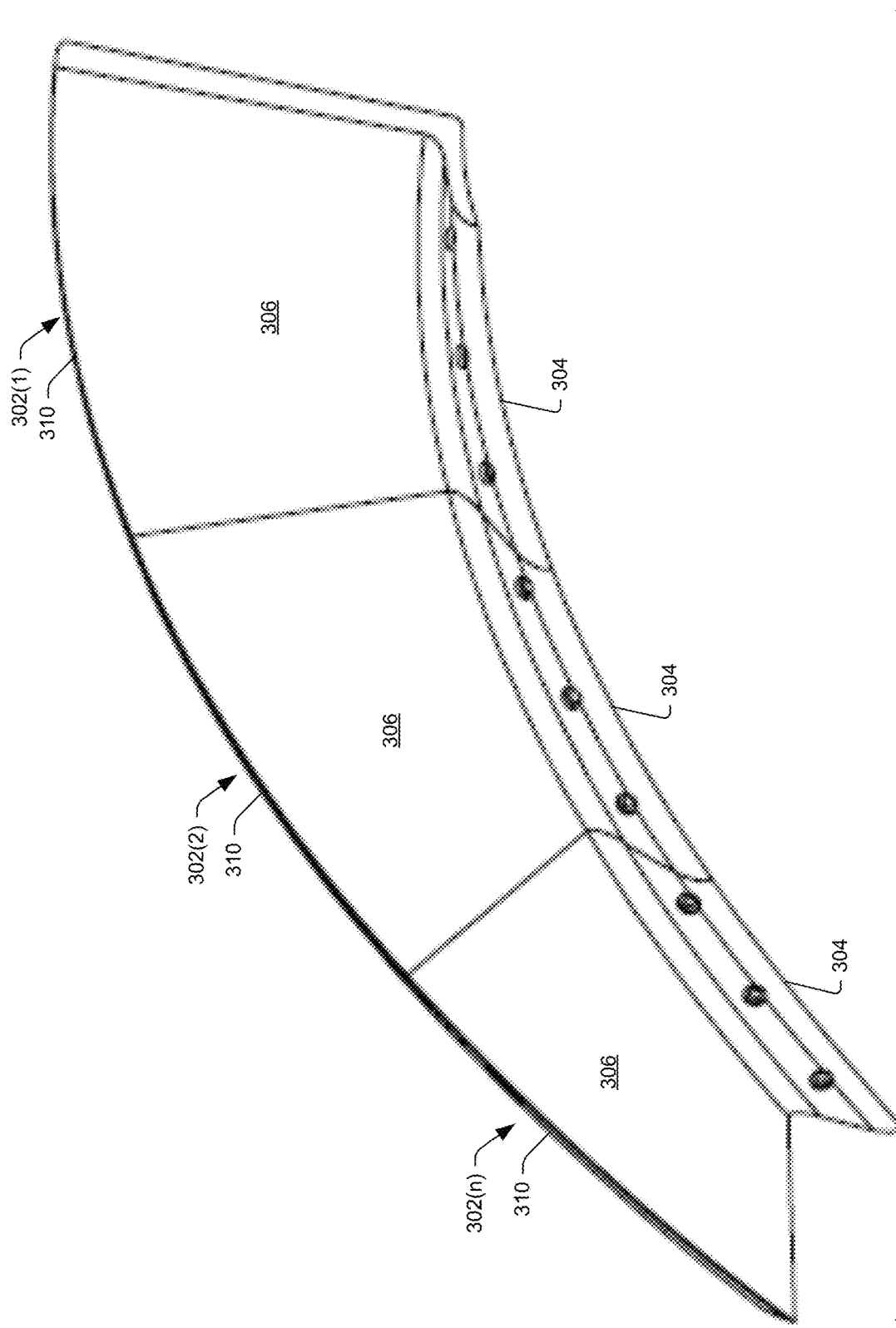
FIG. 4 illustrates a perspective view of a second side of the plurality of blade segments in FIG. 3, according to an embodiment in this disclosure.

FIG. 4 illustrates a perspective view 400 of the plurality of blade segments 302(1)-302(n) in FIG. 3, according to an embodiment in this disclosure. The mounting portion 304 may be integrally formed with the vane portion 306. The vane portion 306 may extend from the integral mounting portion 304 along the helical length thereof.

Figure 5:
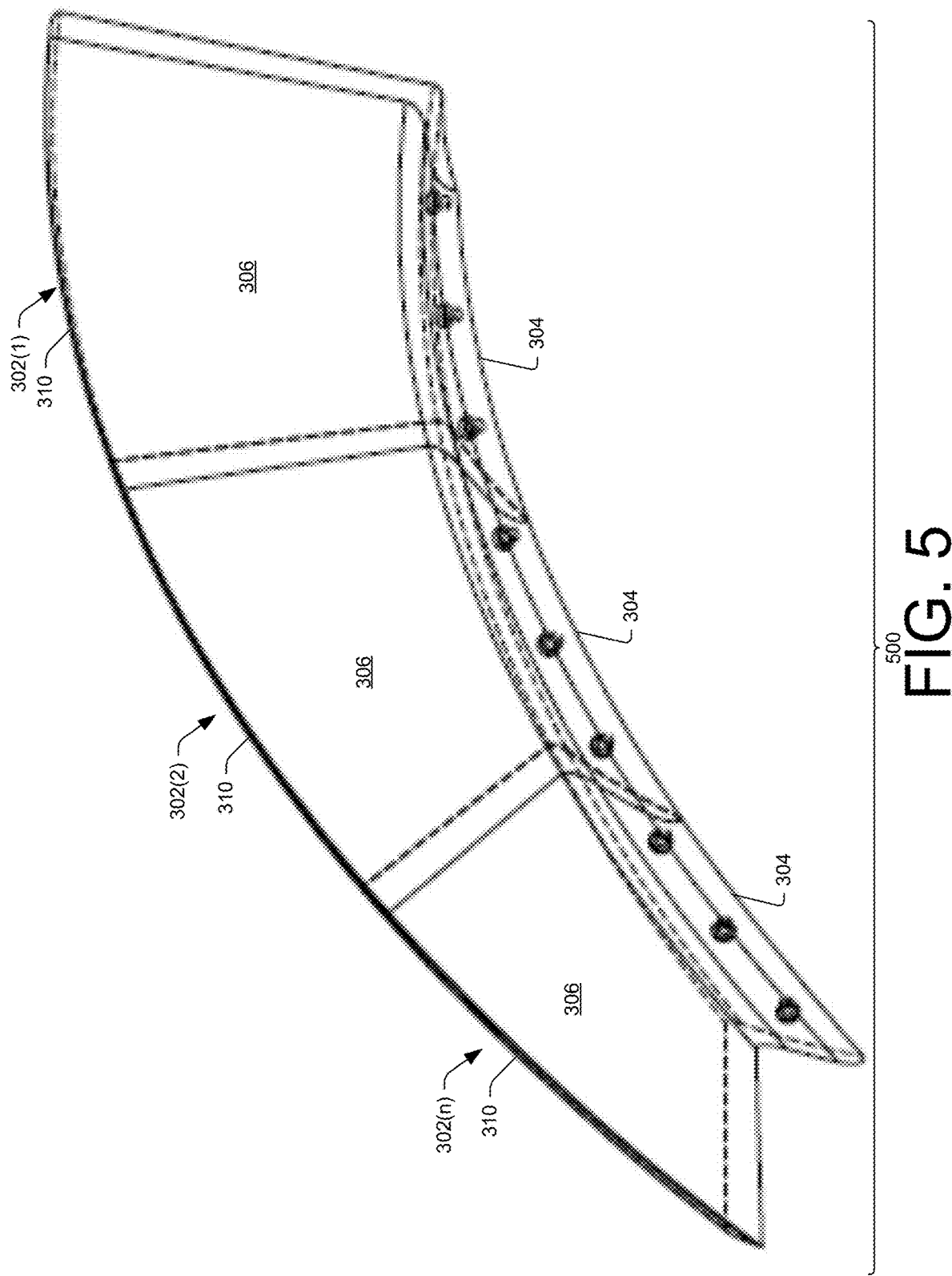
FIG. 5 illustrates a perspective view of the second side of the plurality of blade segments in FIG. 3 with hidden lines shown in dashed lines, according to an embodiment in this disclosure.

FIG. 5 illustrates a perspective view 500 of the plurality of blade segments 302(1)-302(n) in FIG. 3 with hidden lines shown in dashed lines, according to an embodiment in this disclosure. FIG. 5 illustrates the dashed lines where an edge of a blade segment slides over an edge of another blade segment to the left. For example, each of the ends of each blade segment may be shaped substantially the same but in reverse, such that a left end of a first blade segment (e.g., a center or middle blade segment) slips over an end of a second blade segment arranged on the left side of the first blade segment, and the right end of the first blade segment slips under an end of a third blade segment arranged on the right side of the first blade segment. Thus, the respective ends of blade segments may overlap the adjacent ends of adjacent blade segments at an angle of about 45 degrees. Note, however, that the degree of the angled overlapping end is not limited to 45 degrees and may vary as desired between 0 (no overlap) to 90 (no overlap).

Figure 6:
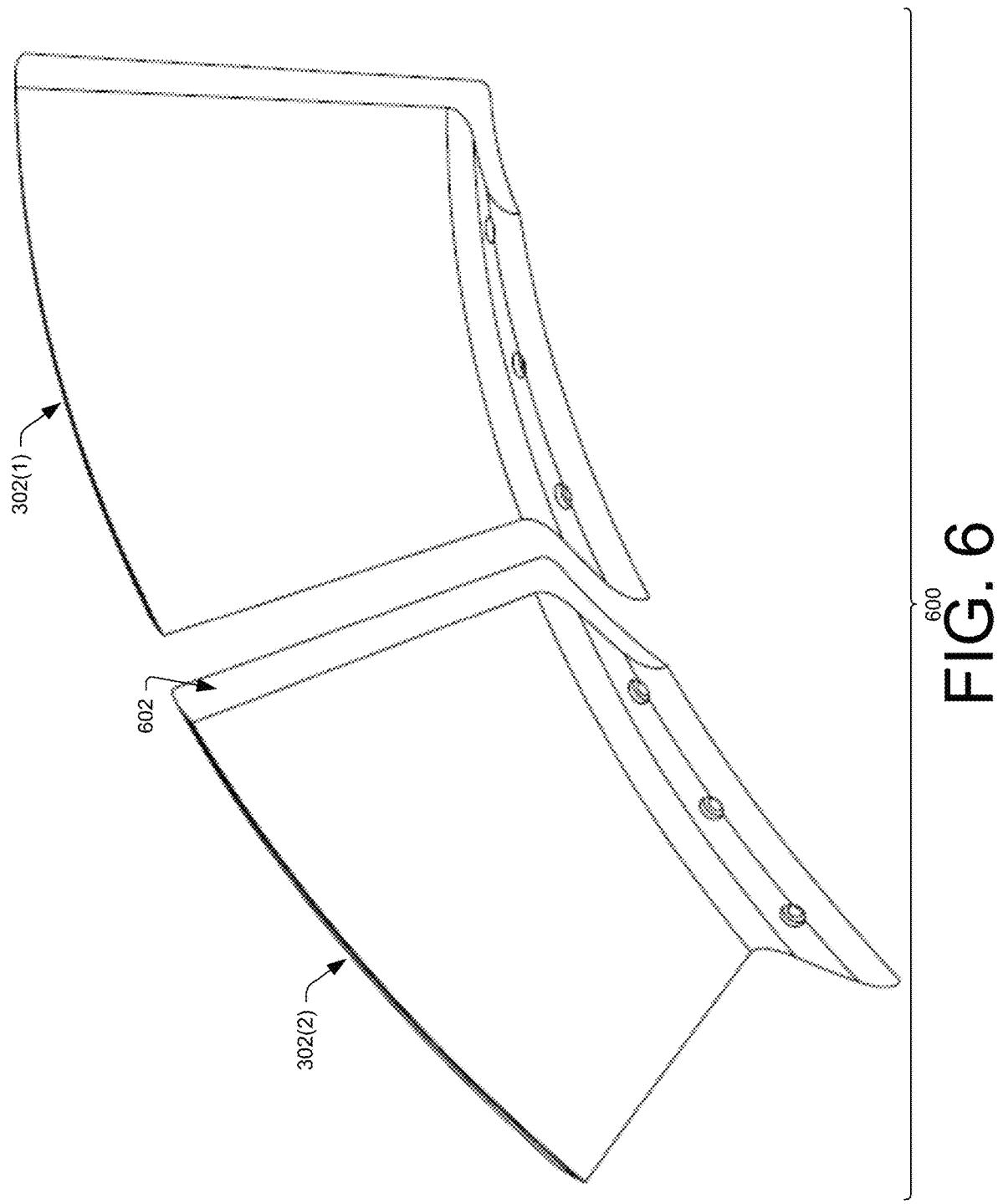
FIG. 6 illustrates a perspective view of separated blade segments of the plurality of blade segments in FIG. 3, according to an embodiment in this disclosure.

FIG. 6 illustrates a perspective view 600 of separated blade segments 302(1) and 302(2) of the plurality of blade segments 302(1)-302(n) in FIG. 3, according to an embodiment in this disclosure. FIG. 6 illustrates an end 602 of the blade segment 302(2). As indicated above, the end 602 of the blade segment 302(2) may overlap the end of the blade segment 302(1) at an angle of about 45 degrees.

Figure 7:
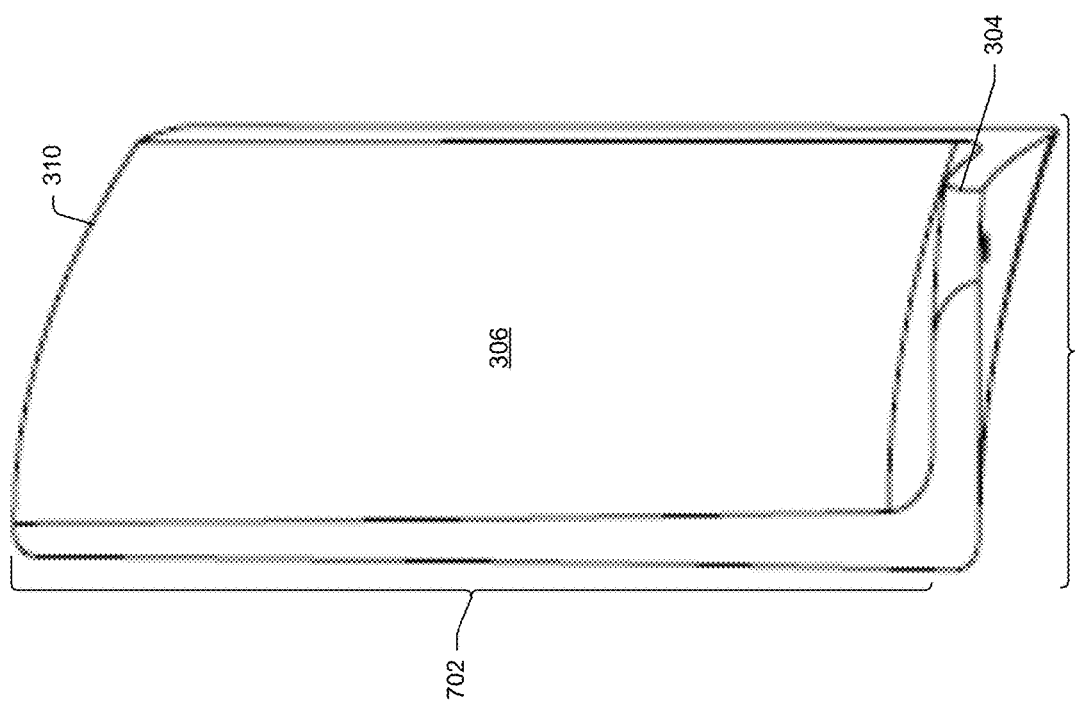
FIG. 7 illustrates a section view of a blade segment of the plurality of blade segments, in FIG. 4, according to an embodiment in this disclosure.

FIG. 7 illustrates a section view 700 of a blade segment (e.g., blade segment 302(2)) of the plurality of blade segments 302(1)-302(n), in FIG. 4, according to an embodiment in this disclosure. Section view 700 illustrates the vane portion 306 including a taper 702 from the mounting portion 304 to the tip 310 of the blade segment. For example, the vane portion 306 reduces in thickness from the mounting portion 304 to the tip 310 of the blade segment. While FIG. 7 illustrates the vane portion 306 including a taper 702, the vane portion 306 may have other thicknesses or shapes. For example, the vane portion may have a front surface and a back surface. The front surface may be oriented in a direction or plane that is transverse to the orientation of the back surface such that the front surface is not oriented parallel to the back surface and a cross section of the blade segment varies from the mounting portion to a tip of the blade segment, along the helical length.

Figure 8:
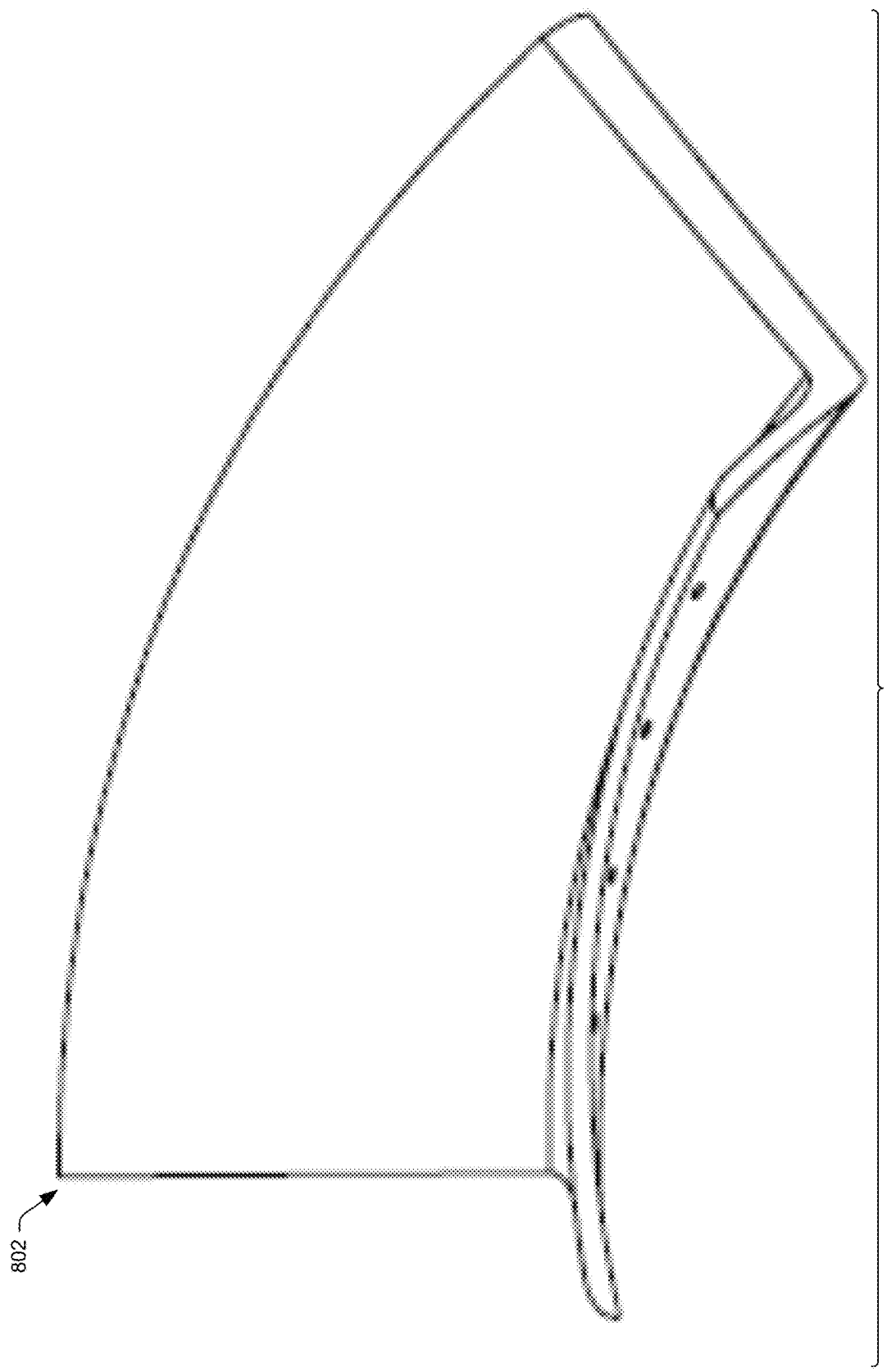
FIG. 8 illustrates a perspective view of a standard inlet blade segment according to an embodiment in this disclosure.

FIG. 8 illustrates a perspective view 800 of a standard inlet blade segment 802 according to an embodiment in this disclosure. The standard inlet blade segment 802 may be an entry blade, which may be substantially the same shape as every other blade segment (e.g., blade segments 208(1)-208(n) or blade segments 302(1)-302(n) attached to a shaft (e.g., shaft 106 or shaft 206).

Figure 9:
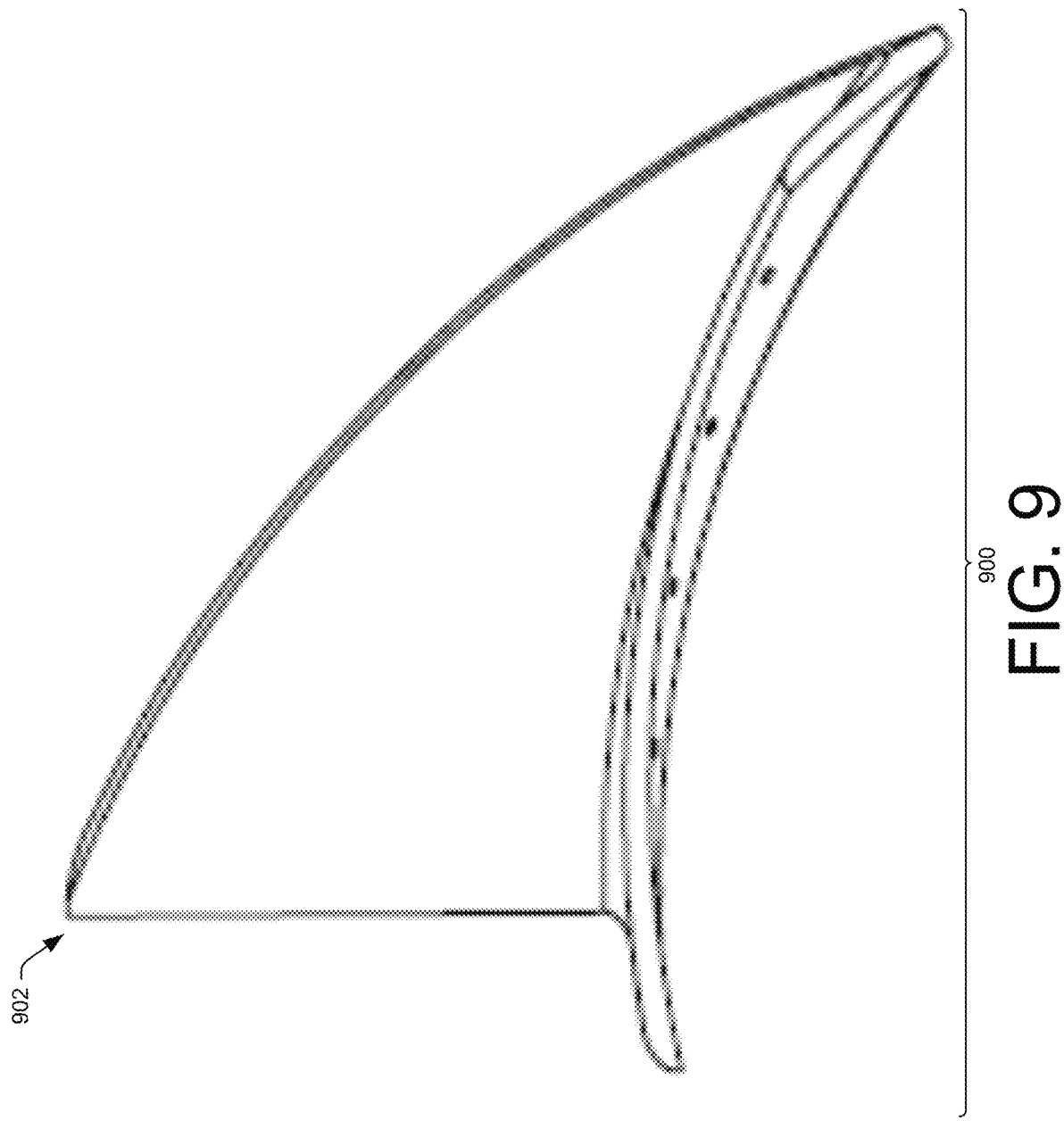
FIG. 9 illustrates a perspective view of an optimized inlet blade segment according to an embodiment in this disclosure.

FIG. 9 illustrates a perspective view 900 of an optimized inlet blade segment 902 according to an embodiment in this disclosure. A curve of the optimized inlet blade segment 902 may be reduced to provide for an optimized end of the optimized inlet blade segment 902. The curve may be calculated to be the actual surface of the water as the water enters the screw system when the blade/turbine is turning, where the screw system may run at about a 26-degree angle. By cutting away the beginning of the entry blade to this shape, the water may encounter less resistance when the water enters the screw system (the opening or aperture into the screw system is larger, so water enters the screw system more easily instead of the screw system "slicing" at the water as each of the entry blades (e.g., four entry blades of four blade flights) rotate. The outlet blade segments, where fluid exits the turbine, may be cut or extended with a rigid flap to reduce noise and sloshing at the exit. The optimized outlet blade segment thereby reducing "churning", splashing, and noise as water exits the turbine.

Figure 10:
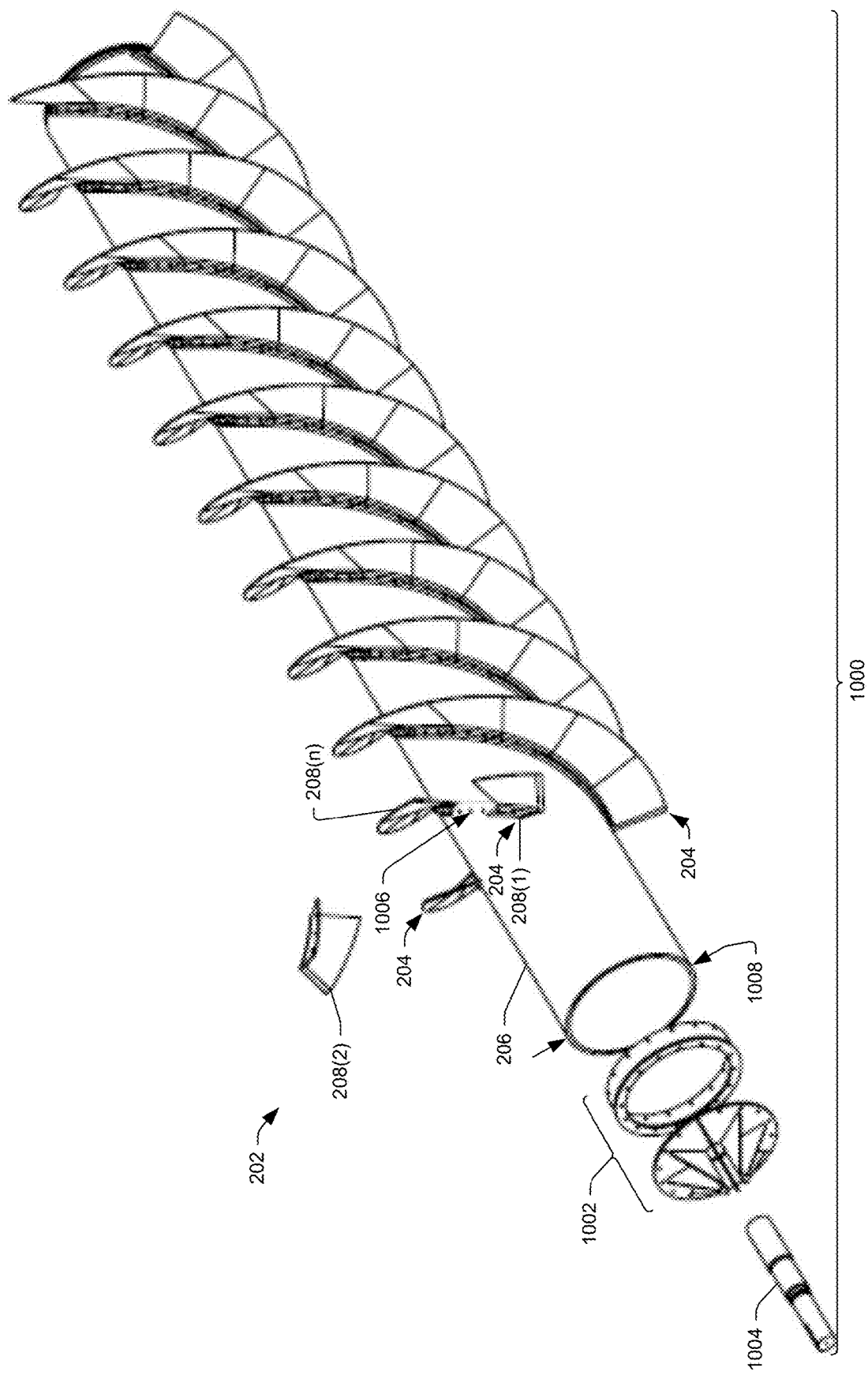
FIG. 10 illustrates a partial exploded assembly view of the screw system, in FIG. 2, according to an embodiment in this disclosure.

FIG. 10 illustrates a partial exploded assembly view 1000 of the screw system 202, in FIG. 2, according to an embodiment in this disclosure. The screw system 202 may include one or more end plate assemblies 1002 and one or more bearing shafts 1004. For example, the screw system 202 may include an upper end plate assembly, a lower end plate assembly, an upper bearing shaft, and a lower bearing shaft. The end plate assemblies 1002 may be attached to ends of the shaft 206. Any blade segment of any of the plurality of blade segments 208(1)-208(n) of any one of the blades 204 may be removed from the shaft 206 without removing a neighboring blade segment.

A helical flight of holes 1006 (e.g., blind holes, through holes, etc.) may be disposed in the shaft 206 to provide for removably attaching the blade segments 208(1)-208(n) to the shaft 206 via the outside of the shaft 206 (e.g., without fixing or receiving fasteners from the inside of the shaft 206). For example, the helical flight of holes 1006 may provide for attaching the blade segments 208(1)-208(n) to the outside surface of the shaft 206 via assembly from the outside of the shaft, without the need to have any fastener (e.g., a nut), equipment or personnel on the inside of the shaft. Each blade segment may have blind or through holes (e.g., about one hole per ten degrees of blade segment) drilled and counterbored or countersunk in the mounting portion of the blade segment with a template created from the same "plug" used to create the blade segment mold. The exact mating holes may be drilled around the shaft 206 for mounting all of the blade segments using a multi-axis machining process. The multi-axis machining process may include a drill press mounted on a precision digital x-y table that always insures the holes are drilled perpendicular to the surface of the shaft 206 (e.g., the drill press is moved in or out at about a "90-degree" or about a horizontal location on the shaft 206). In another example, the machining process may include match drilling from inside or outside of the shaft 206. The multi-axis machining process may include an encoder and digital readout on the shaft 206 to know and control a theta (e.g., a rotational position of the shaft 206) while the shaft 206 is turned or rotated. The shaft 206 may be turned or rotated via installed bearings and/or shafts. The multi-axis machining process may include stopping and/or braking the turning or rotation at very precise pre-calculated positions around the shaft 206. The multi-axis machining process may include, for each hole, the drill press moving up or down the shaft 206 to a new "x-y" calculated position along the helix. The multi-axis machining process may provide for indexing, knowing the orientation, and reproducibility for mating of the blade segments 208(1)-208(n) to the shaft 206. One or more inserts may be fixed in the helical flight of holes 1006. The one or more inserts may be disposed to receive fasteners and removeably attach the blade segments 208(1)-208(n) to the shaft 206. The blade segments 208(1)-208(n) may be removably attached to the shaft 206 from the outside of the shaft, without having to secure any fasteners from the inside of the shaft 206. The one or more inserts may include one or more threaded inserts.

In one example, the formation process used to create the shaft 206 is so refined that a diameter 1008 of the outside surface of the shaft 206 may vary no more than about minus ten thousandths of an inch to at most about plus ten thousandths of an inch. In another example, the diameter 1008 of the outside surface of the shaft 206 may vary no more than about minus ⅛ of an inch to at most about plus 1/10 of an inch. Further, the process of forming the diameter 1006 of the outside surface of the shaft 206 may be finished while the end plate assemblies 1002 are attached to the ends of the shaft 206. In an embodiment, the shaft 206 may be solid or semi-solid (i.e., a thick shaft cylindrical wall). Alternatively, and according to the depicted embodiments, the shaft 206 may be a tube, and may have a tube wall thickness of about one inch.

Figure 11:
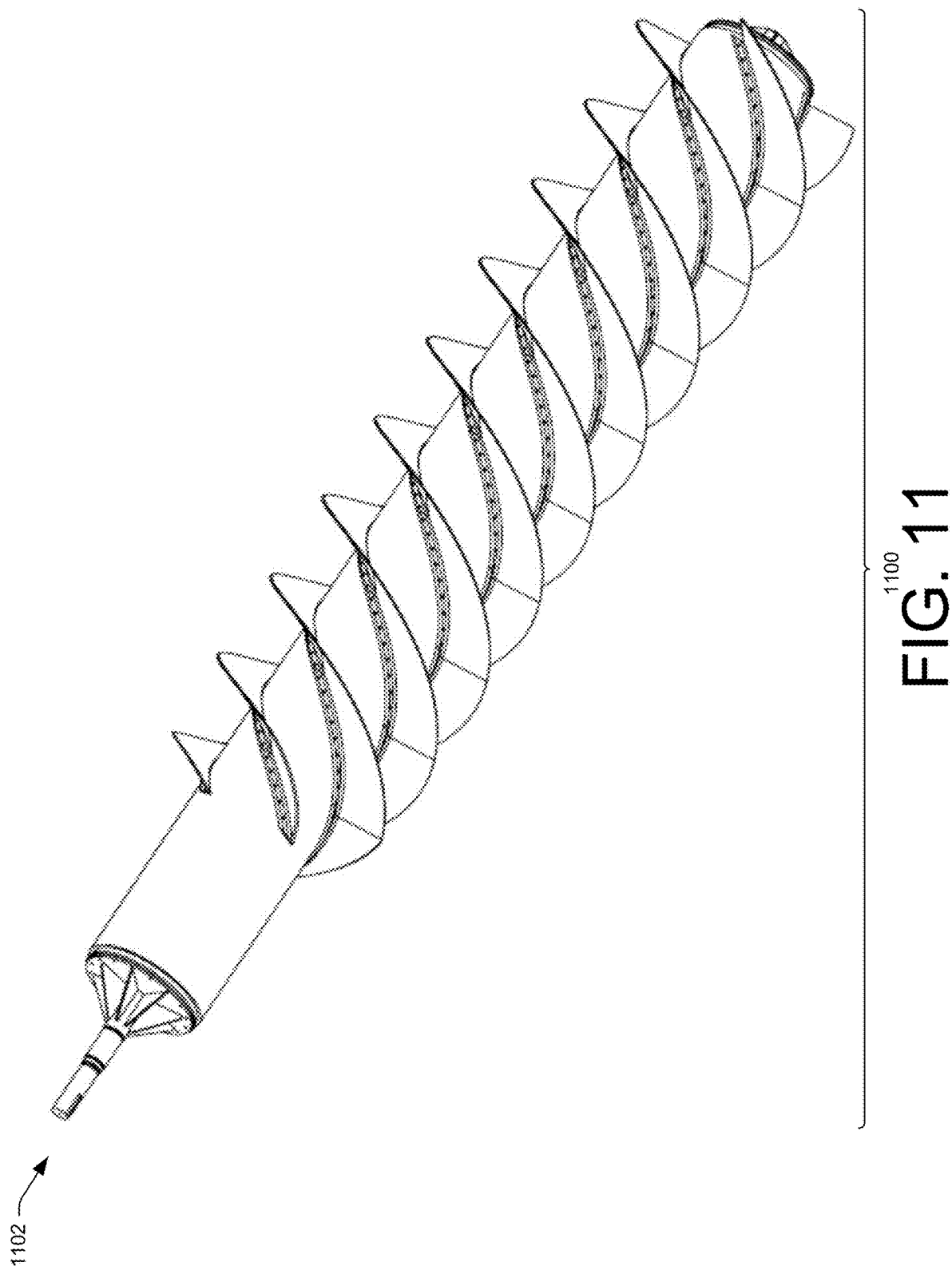
FIG. 11 illustrates a perspective view of an optimized example screw system that may be implemented in the hydrodynamic environment of FIG. 1 according to an embodiment in this disclosure.

FIG. 11 illustrates a perspective view 1100 of an optimized screw system 1102 that may be implemented in the hydrodynamic environment of FIG. 1 according to an embodiment in this disclosure. The optimized screw system 1102 may include optimized inlet blade segments and/or optimized outlet blade segments. For example, the optimized inlet blade segment 902 may be attached to the shaft as the first blade segment of the plurality of blade segments that form the blades of the optimized screw system 1102.

Figure 12:
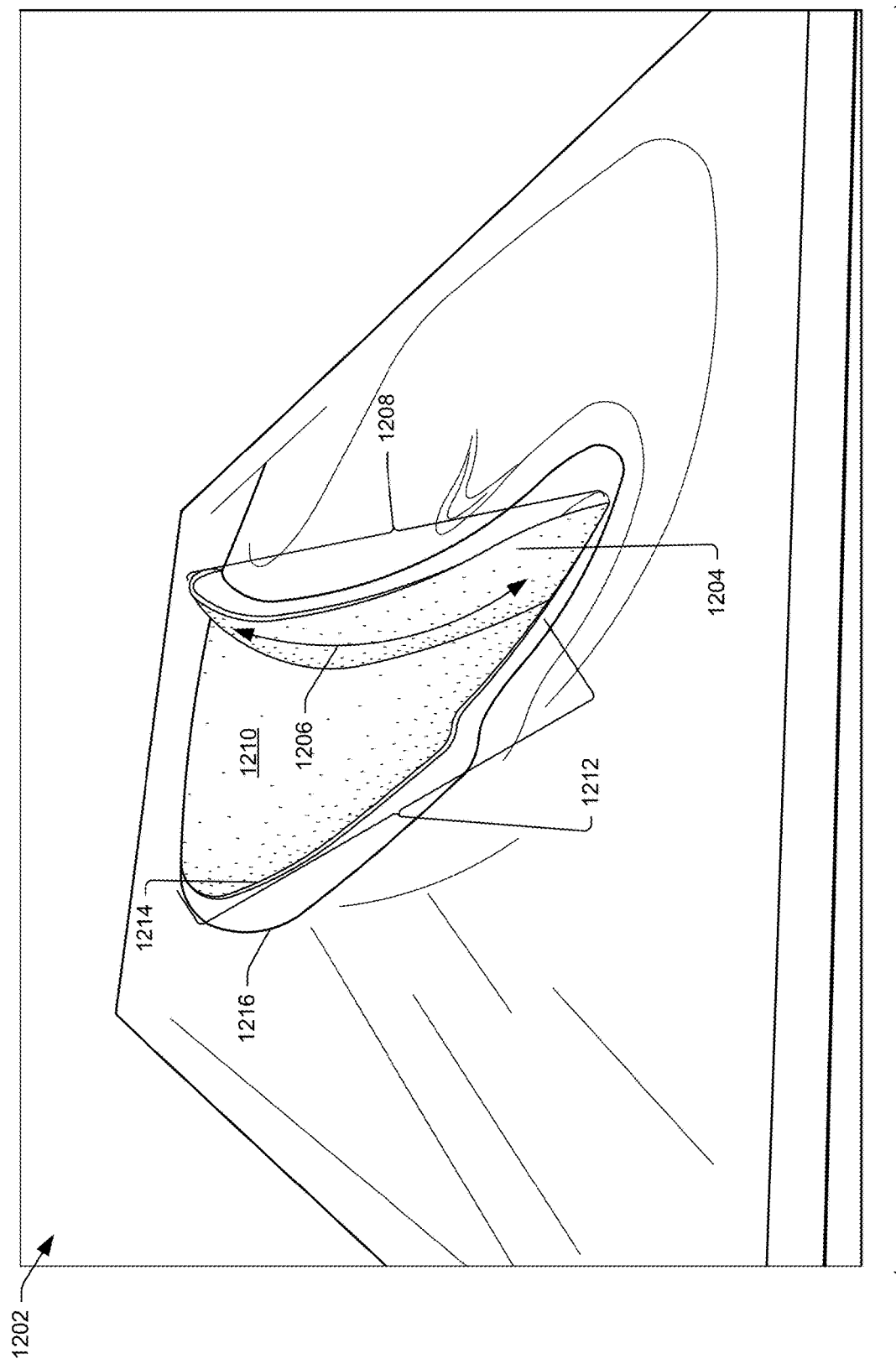
FIG. 12 illustrates a perspective view of a first side ("A" side) of a mold according to an embodiment in this disclosure.

FIG. 12 illustrates a perspective view 1200 of a first side 1202 ("A" side) of a mold. A mounting portion 1204 of fiber may be formed in the first side 1202 of the mold such that the mounting portion 1204 has a helical length 1206 and a first helicoid shape 1208. A vane portion 1210 of the fiber may be formed in the first side 1202 of the mold such that the vane portion 1210 extends from the mounting portion 1204 along the helical length 1206 thereof and has a second helicoid shape 1212 different than the first helicoid shape 1208. In one example, the vane portion 1210 may be tapered from the mounting portion 1204 to a tip 1214 of the vane portion 1210. In another example, the vane portion may have a front surface and a back surface, where the front surface may not be parallel to the back surface such that a cross section of the blade segment varies from the mounting portion to a tip of the blade segment, along the helical length. The mounting portion 1204 may be formed integrally with the vane portion 1210. Subsequent to the molding process, the mounting portion 1204 forms the mounting portion of the blade segment and the vane portion 1210 forms the vane portion of the blade segment.

The fiber of the mounting portion 1204 may include chopped fiber, woven fiber or fiber mat. The fiber may be loaded into the first side 1202 of the mold over a gelcoat 1216. For example, a gelcoat may be applied to the first side 1202 of the mold, and the fiber may then be loaded into the first side 1202 of the mold over the gelcoat 1216. A coating may be applied to the first side 1202 of the mold for increased resistance to wear or impact from debris, or to corrosion. For example, a coating may be applied over the gelcoat 1216 applied to the first side 1202 of the mold for increased resistance to wear or impact from debris.

Figure 13:
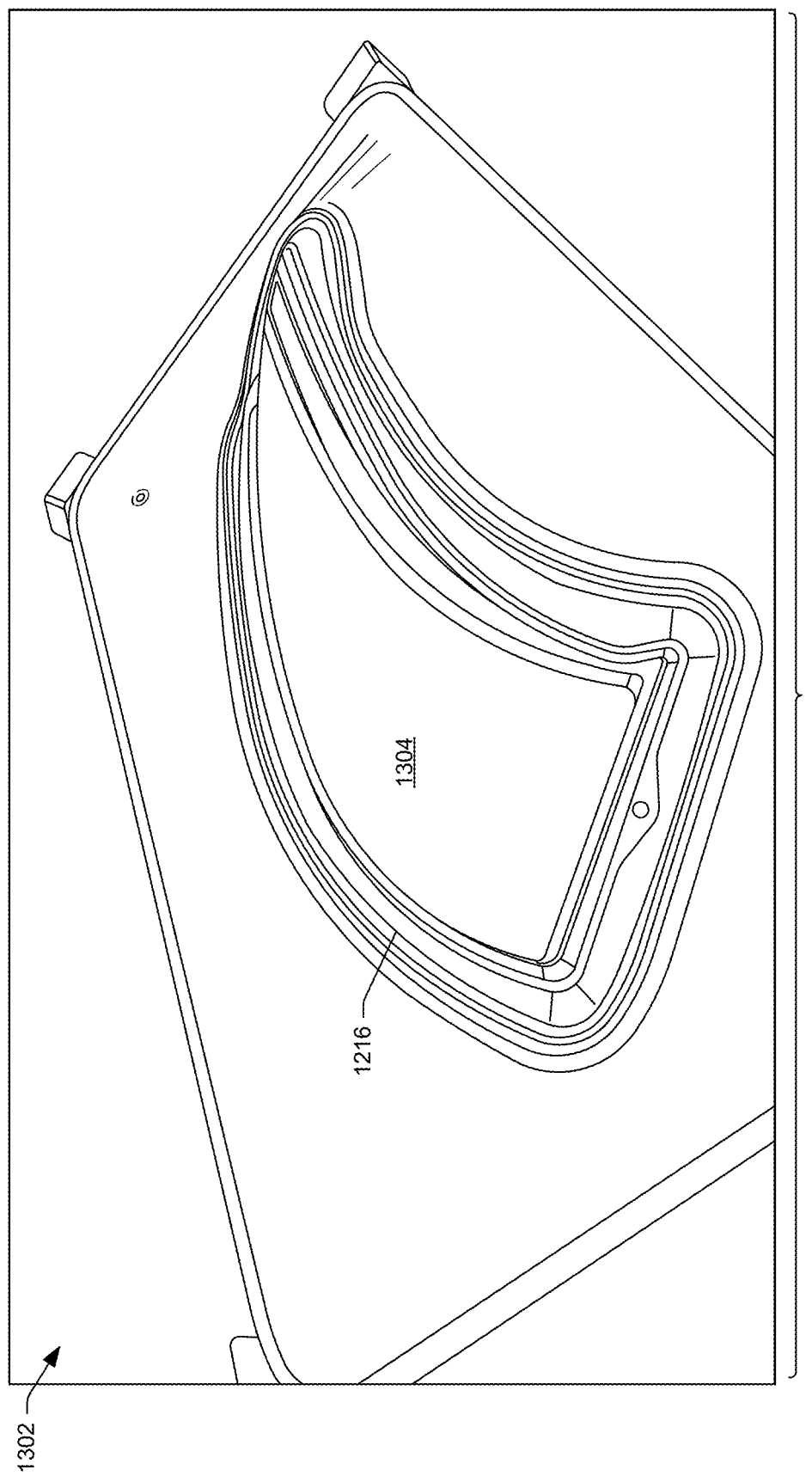
FIG. 13 illustrates a perspective view of a second side ("B" side) of the mold according to an embodiment in this disclosure.

FIG. 13 illustrates a perspective view 1300 of a second side 1302 ("B" side) of the mold. The second side 1302 of the mold may be attached to the first side 1202 of the mold. For example, the first side 1202 and the second side 1302 of the mold may be placed together. With the first side 1202 attached to the second side 1302, the mold may be closed. The mold may be closed via sealing the mold under vacuum or under pressure.

In an embodiment of the blade segment formation process, a resin may be introduced into the mold. For example, as vacuum pressure is applied to the sealed mold, a catalyzed resin may be drawn into the mold through ports incorporated in the mold. A resin injection pump may be used to accelerate the resin infusion process. Upon introduction to the mold, the resin may travel around the mold cavity until the cavity and fiber are filled and resin begins to come out of a return resin port. The return resin port may be arranged in the second side 1302 of the mold.

The mold may remain closed for curing of the resin. The mold may be cooled internally or the temperature may be monitored with an infra-red sensor outside of the mold to ensure it does not overheat. After sufficient curing has occurred, the mold is opened and a first blade segment may be left to cool further in the first side 1202 of the mold to prevent any distortion of the first blade segment. After de-molding the first blade segment, a flashing may be removed with a router and the gelcoat may be touched up as needed.

The first side 1202 and the second side 1302 of the mold may be utilized to form additional blade segments, each additional blade segment substantially similar to the first blade segment. For example, the first side 1202 and the second side 1302 of the mold may be a closed mold system capable of reproducing substantially identical blade segments. The closed mold system formation process may be a vacuum process or a pressure process. The closed mold system may utilize a flexible second side 1302 such as a reusable vacuum bag. Further, structural properties, wear properties, corrosion resistance, or surface characteristics may be tailored for one or more blade segments via varying materials, resins, or coatings arranged in the closed mold system formation process. For example, one or more carbon fiber layers or other materials could be used in the mold to increase the strength to weight ratio of the blade.

FIG. 13 illustrates the gelcoat 1216 may be applied to the second side 1302 of the mold. A coating 1304 may be applied to the second side 1302 of the mold cavity for increased resistance to wear or impact from debris or corrosion. For example, the coating 1304 may be applied for increased resistance to wear or impact from debris.

Figure 14:
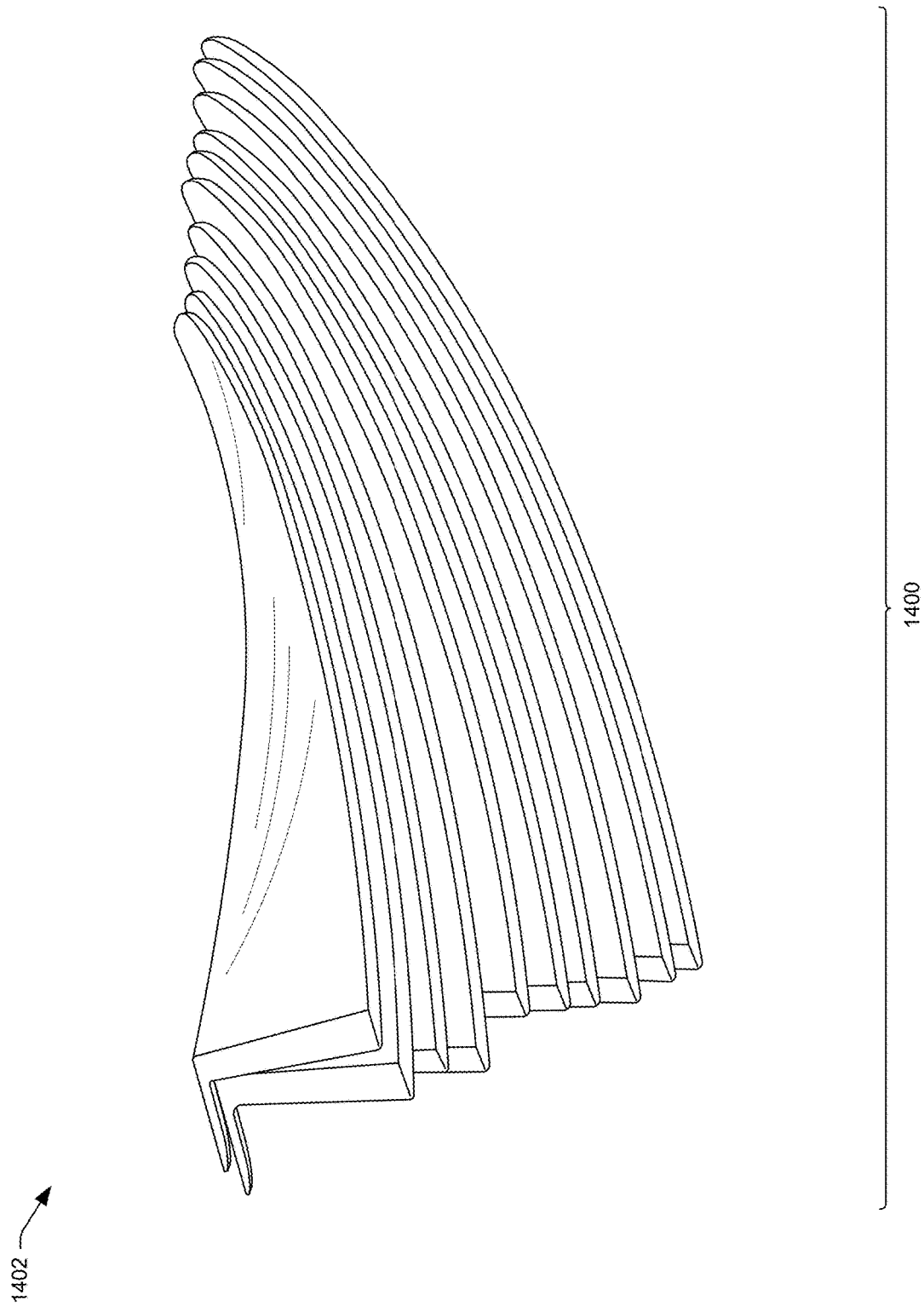
FIG. 14 illustrates a perspective view of a stack of blade segments according to an embodiment in this disclosure.

FIG. 14 illustrates a perspective view 1400 of a stack 1402 of blade segments 1404. The blade segments 1404 may be representative of the blade segments 208(1)-208(n) or blade segments 302(1)-302(n). Each blade segment of the stack of blade segments 1404 may be stacked on another blade segment such that the mounting portion (e.g., mounting portion 304) of a blade segment interfaces with the mounting portion of another second blade segment, and the vane portion (e.g., vane portion 306) of the blade segment interfaces with the vane portion of the other blade segment. For example, a blade segment may be stackable such that when stacked with other blade segments, adjacent surfaces are oriented flushly together. In one example, each blade segment of the stack of blade segments 1404 may include a flashing. The flashing may be a feature resulting from the molding process. In another example, each blade segment of the stack of blade segments 1404 may be void of the flashing. For example, after the blade segment is de-molded, the flashing may be removed.

Example Method of Making a Screw System

Figure 15A:
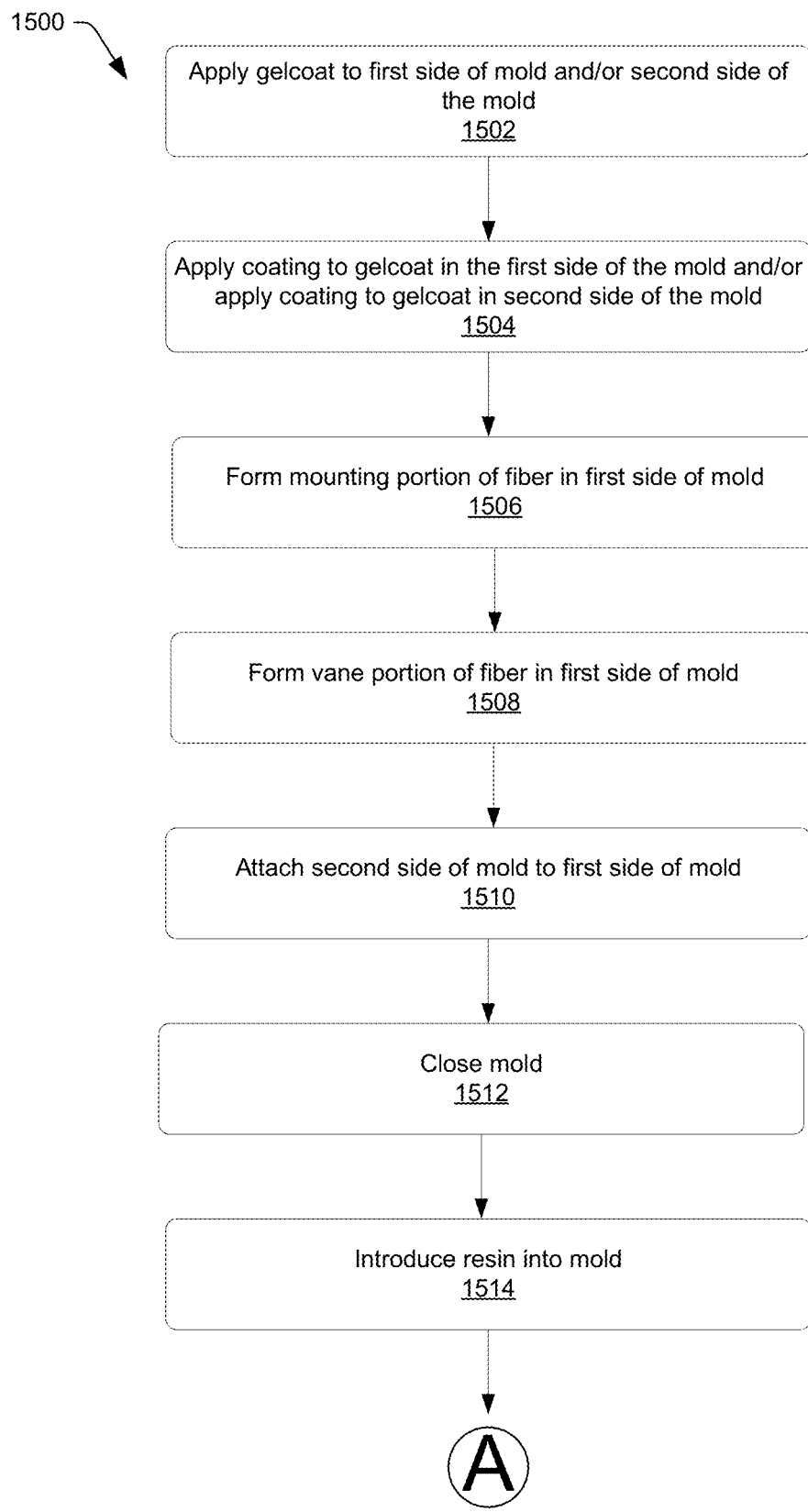
FIGS. 15A and 15B depict a flow diagram illustrating an example process of making a screw system according to an embodiment in this disclosure.
Figure 15B:
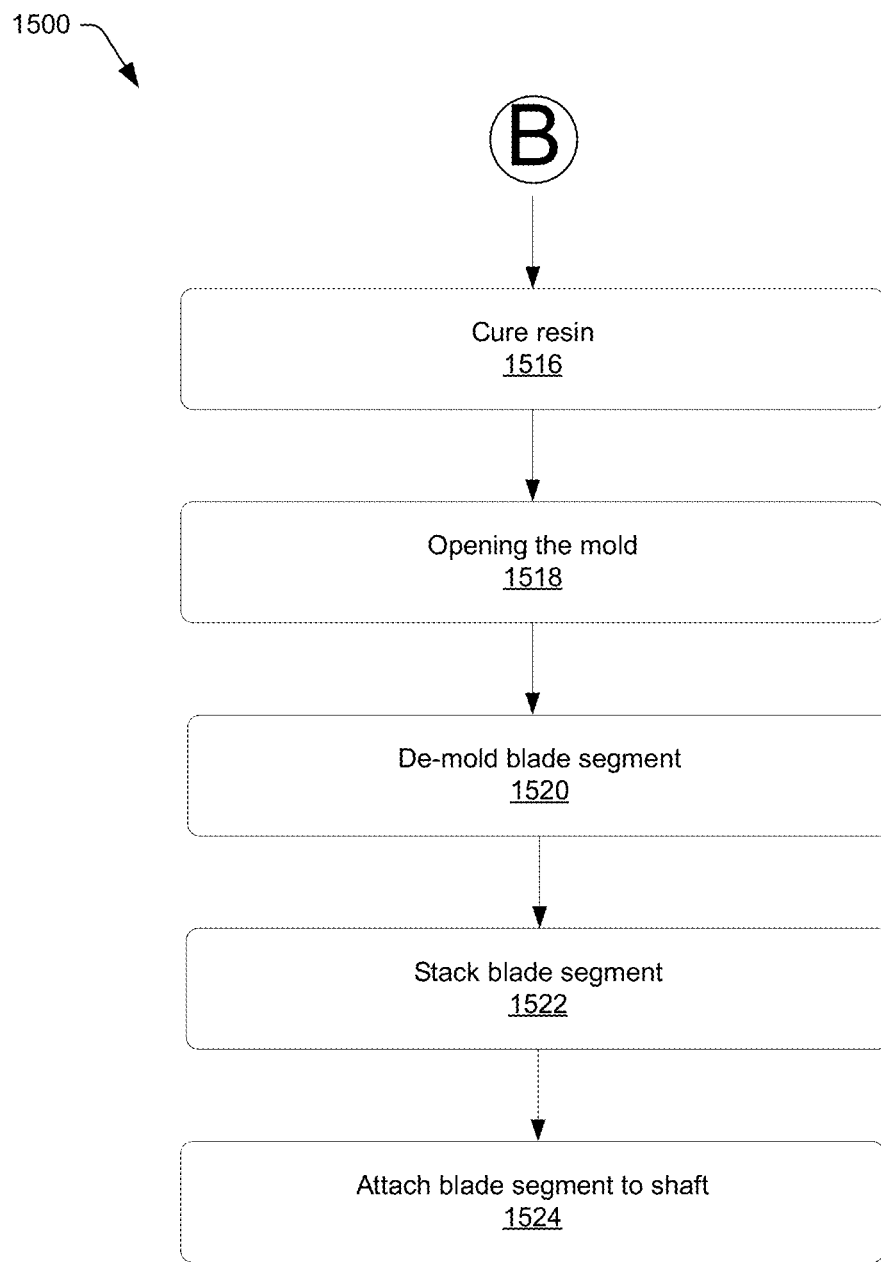

FIG. 15 illustrates an example method 1500 of making a screw system (e.g., screw system 202 or screw system 1102) based at least in part on forming a blade segment (e.g., blade segments 208(1)-208(n), blade segments 302(1)-302(n), blade segment 802, or blade segment 902) removably attachable to an outside surface of a shaft (e.g., shaft 206). For instance, this process may be performed to produce or manufacture a screw system having blade segments formed of a composite material, where the blade segments are removably attachable to a shaft, which provides for: consistency, repeatability, higher productivity, and lower costs in producing the blade segments. Additionally, utilizing gelcoat in the mold as an integral part of the manufacturing process provides a smooth, reproducible surface with less hydraulic friction and eliminates the need for prepping and final painting of the blades, as compared with all steel screws today.

Further, because the blade segments are removably attachable to the shaft, the screw systems may be shipped unassembled and subsequently assembled or replaced in the field reducing an amount of time and a cost of deploying and maintaining the screw systems. While FIG. 15 illustrates a method of making a screw system used in a hydrodynamic environment to produce power, this method may apply to making screw systems used in other fields such as in a hydrodynamic environment to pump water or other fluids, in a hydrodynamic environment as a fishway, in a dry environment as a conveyor to move granular materials, in a drilling environment as an augur to bore a hole, etc. Further, while FIG. 15 illustrates a method of making screw systems having blade segments that are removably attachable to a shaft as well as the post-manufacture step of installation, this method may apply to making screw systems having blade segments that are permanently attached to the shaft.

Method 1500 may include operation 1502, which represents applying a gelcoat (e.g., gelcoat 1216) to a first side (e.g., first side 1202) of a mold cavity and/or applying the gelcoat to a second side (e.g., second side 1302) of the mold cavity. Method 1500 may proceed to operation 1504, which represents applying a coating (e.g., coating 1304) to the first side of the mold cavity and/or applying the coating to the second side of the mold cavity for increased resistance to wear or impact from debris or corrosion. For example, a hard-facing may be applied to the first side of the mold cavity and/or applied to the second side of the mold cavity for increased resistance to wear or impact from debris. This may be particularly advantageous for the second side because the second side of the blade segment is expected to have the most friction/wear as it faces the incoming water or fluid flows.

Method 1500 may include an operation 1506, which includes forming, in the first side of a mold, a mounting portion (e.g., mounting portion 1204) of fiber such that the mounting portion has a helical length (e.g., helical length 1206) and a first helicoid shape (e.g., first helicoid shape 1208).

Method 1500 may include operation 1508, which includes forming, in the first side of the mold, a vane portion (e.g., vane portion 1210) of the fiber such that the vane portion extends from the mounting portion along the helical length thereof and has a second helicoid shape (e.g., second helicoid shape 1212) different than the first helicoid shape. The vane portion may be tapered from the mounting portion to a tip (e.g., tip 1214) of the vane portion. The vane portion may have other cross sections than a taper. The mounting portion of fiber may be integrally formed with the vane portion of fiber.

Method 1500 may continue with operation 1510, in which the second side of the mold is attached to the first side of the mold. For example, the second side of the mold is placed on top of the first side of mold. Operation 1510 may be followed by operation 1512, in which the mold is closed. For example, the mold may be closed via sealing the mold under vacuum.

Method 1500 may continue with operation 1514, which includes introducing a resin into the mold. For example, as vacuum pressure is applied to the sealed mold, a catalyzed resin may be drawn into the mold through ports incorporated in the mold.

Method 1500 may further include operation 1516, which includes curing the resin. In an embodiment, the mold may remain closed for curing of the resin, and the mold may be cooled or the temperature may be monitored with an infrared sensor outside of the mold to ensure that the mold and/or the blade segment being formed therein does not overheat.

Method 1500 may include operation 1518, in which the mold is opened, and a first blade segment may be left to cool further in the first side of the mold to prevent any distortion of the first blade segment.

In an embodiment, after operation 1518 is finished, the blade segment may be de-molded in operation 1520. Operation 1520 may further include removing flashing from the de-molded blade segment and touching up the gel-coat as needed. At a time where space is desired to be maximized and/or for shipping purposes possibly, operation 1520 may be followed by operation 1522, which includes stacking the blade segments.

As discussed above, although the blade segments may be stacked for storage or shipping, method 1500 may further include operation 1524, which discusses removably attaching the blade segments to a shaft (e.g. shaft 206). For example, a helical flight of holes (e.g., helical flight of holes 1006) may be disposed in the shaft 206 to provide for removably attaching the blade segments to the shaft. One or more inserts may be fixed in the helical flight of holes 1006 to receive fasteners and removeably attach the blade segments to the shaft.

Conclusion

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having certain shapes, sizes, and configurations, these shapes, sizes, and configurations are merely illustrative.

What is claimed is:

1. A method of making a screw system, the method comprising:
    forming a blade segment that is removably attachable to an outside surface of a shaft, the blade segment including a mounting portion and a vane portion, and the forming of the blade segment including:
        forming, in a first side of a mold, the mounting portion and vane portion of a fiber material such that:
            the mounting portion has a helical length and a first helicoid shape, and
            the vane portion extends from the mounting portion along the helical length thereof and has a second helicoid shape different than the first helicoid shape, the vane portion having a front surface and a back surface, whereby the front surface is not parallel to the back surface such that a cross section of the blade segment varies from the mounting portion to a tip of the blade segment, along the helical length,
        attaching a second side of the mold to the first side of the mold,
        closing the mold, and
        introducing a resin into the mold,
    wherein the fiber material and the resin material used for forming the vane portion and the mounting portion, respectively, are selected based at least in part, on physical and/or structural characteristics specific to a location where the screw system is to be implemented.

2. The method of claim 1, wherein the second side of the mold is a vacuum bag or other non-rigid surface.

3. The method of claim 1, wherein the forming of the blade segment further includes:
    applying a gelcoat to the first side of the mold, or
    applying a gelcoat to the second side of the mold.

4. The method of claim 1, wherein the forming of the blade segment further includes:
    applying a coating to the first side of the mold for increased resistance to wear or impact from debris or corrosion, or
    applying a coating to the second side of the mold for increased resistance to wear or impact from debris or corrosion.

5. The method of claim 1, wherein the blade segment is a first blade segment, and
wherein the method further comprises:
forming a second blade segment substantially identical to the first blade segment,
forming the shaft, and
removably attaching the first blade segment and the second blade segment to the outside surface of the shaft such that at least a portion of the first blade segment overlaps at least a portion of the second blade segment along the helical length.

6. The method of claim 1, wherein the forming of the mounting portion further includes forming, in the first side of the mold, the mounting portion such that the mounting portion extends at an angle away from a back surface of the vane portion along the helical length such that the blade segment has an L-shaped or T-shaped cross-section profile.

7. A method of making a screw system, the method comprising:
forming, in a mold, a first blade segment that is removably attachable to an outside surface of a shaft, the first blade segment including a mounting portion and a vane portion,
forming, in the mold, a second blade segment that is removably attachable to the outside surface of the shaft, the second blade segment including a mounting portion and a vane portion,
removably attaching the mounting portion of the first blade segment to the shaft via fasteners aligned with a helical flight of holes, respectively, disposed in the outside surface of the shaft, and
removably attaching the mounting portion of the second blade segment to the shaft via the fasteners aligned with the helical flight of holes such that the mounting portion of the second blade segment is aligned around the outside surface of the shaft with the mounting portion of the first blade segment, the vane portion of the second segment being aligned around the outside surface of the shaft with the vane portion of the first blade segment, and a portion of the second blade segment overlaps a portion of the first blade segment.

8. The method of claim 7, wherein the mold includes a first side and a second side, and
wherein the forming of the first blade segment includes:
forming, in the first side of the mold, the mounting portion and the vane portion of a fiber material such that:
the mounting portion has a helical length and a first helicoid shape, and
the vane portion extends from the mounting portion along the helical length thereof and has a second helicoid shape different than the first helicoid shape.

9. The method of claim 8, wherein the forming of the mounting portion of the first blade segment further includes forming, in the first side of the mold, the mounting portion such that the mounting portion extends at an angle away from a back surface of the vane portion along the helical length such that the blade segment has an L-shaped or T-shaped cross-section profile.

10. The method of claim 8, wherein the second side of the mold is a vacuum bag or other non-rigid surface.

11. The method of claim 8, wherein the forming of the first blade segment further includes:
applying a gelcoat to the first side of the mold, or
applying a gelcoat to the second side of the mold.

12. The method of claim 8, wherein the forming of the first blade segment further includes:
applying a coating to the first side of the mold for increased resistance to wear or impact from debris or corrosion, or
applying a coating to the second side of the mold for increased resistance to wear or impact from debris or corrosion.

13. The method of claim 7, wherein the removably attaching of the mounting portion of the first blade segment to the shaft via fasteners aligned with the helical flight of holes, respectively, disposed in the outside surface of the shaft includes securing fasteners to the helical flight of holes without securing fasteners from an inside of the shaft.

14. The method of claim 13, wherein the removably attaching of the mounting portion of the first blade segment to the shaft via fasteners aligned with the helical flight of holes, respectively, disposed in the outside surface of the shaft further includes securing fasteners to inserts without securing fasteners from the inside of the shaft.

15. A method of making a screw system, the method comprising:
forming a blade that is removably attachable to an outside surface of a shaft, the forming of the blade including:
forming, in a mold, a mounting portion and a vane portion of a first blade segment of the blade such that the mounting portion has a helical length and a first helicoid shape and the vane portion extends from the mounting portion along the helical length thereof and has a second helicoid shape different than the first helicoid shape, and
forming, in the mold, a second blade segment of the blade substantially identical to the first blade segment.

16. The method of claim 15, wherein the mold includes a first side and a second side, and wherein the forming of the first blade segment includes:
forming, in the first side of the mold, the mounting portion and the vane portion of a fiber material.

17. The method of claim 16, wherein the forming of the mounting portion and the vane portion of the fiber material further includes forming, in the first side of the mold, the mounting portion such that the mounting portion extends at an angle away from a back surface of the vane portion along the helical length such that the blade segment has an L-shaped or T-shaped cross-section profile.

18. The method of claim 16, wherein the second side of the mold is a vacuum bag or other non-rigid surface.

19. The method of claim 16, wherein the forming of the first blade segment further includes:
applying a gelcoat to the first side of the mold, or
applying a gelcoat to the second side of the mold.

20. The method of claim 16, wherein the forming of the first blade segment further includes:
applying a coating to the first side of the mold for increased resistance to wear or impact from debris or corrosion, or
applying a coating to the second side of the mold for increased resistance to wear or impact from debris or corrosion.

\* \* \* \* \*